UNITED STATES PATENT OFFICE.

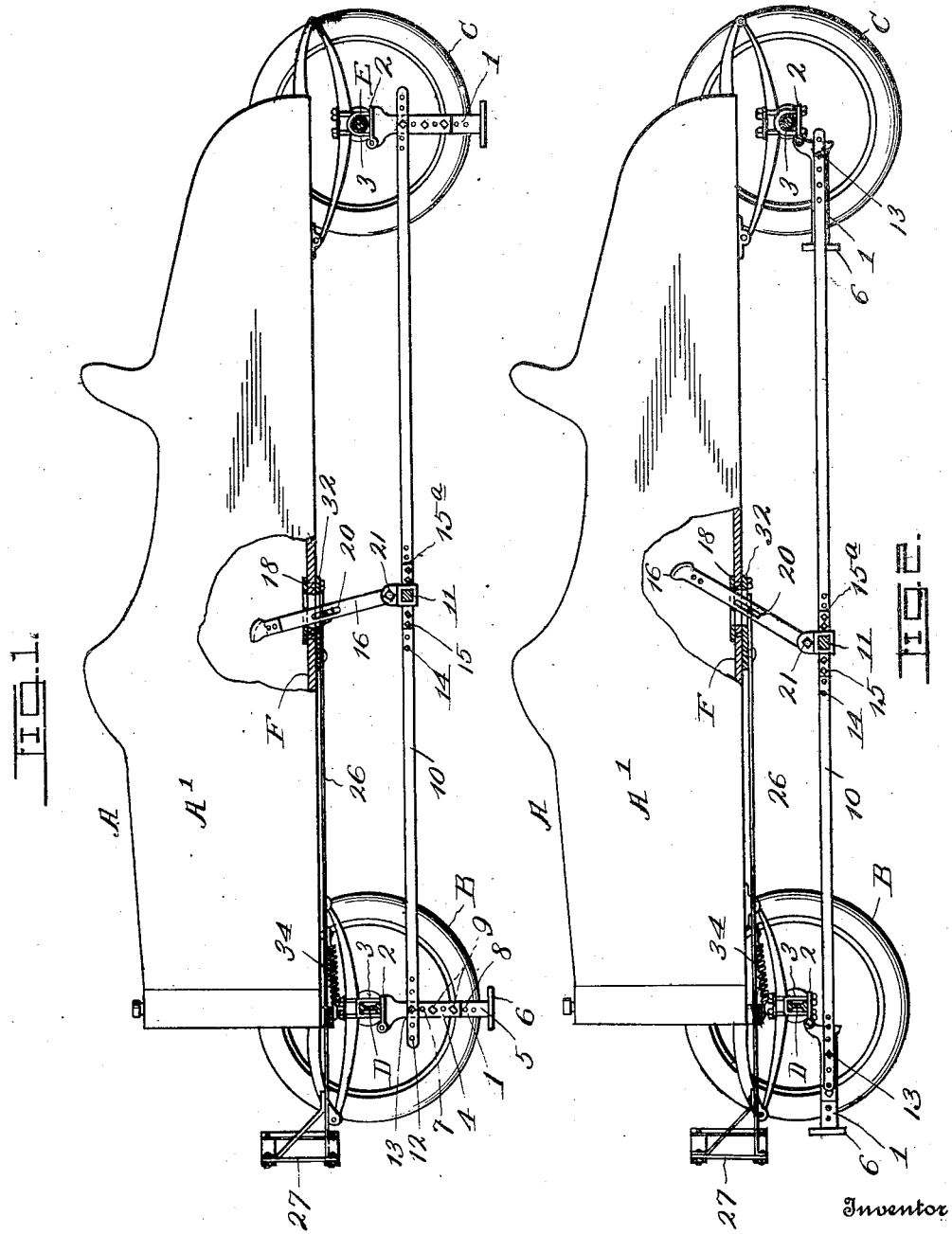

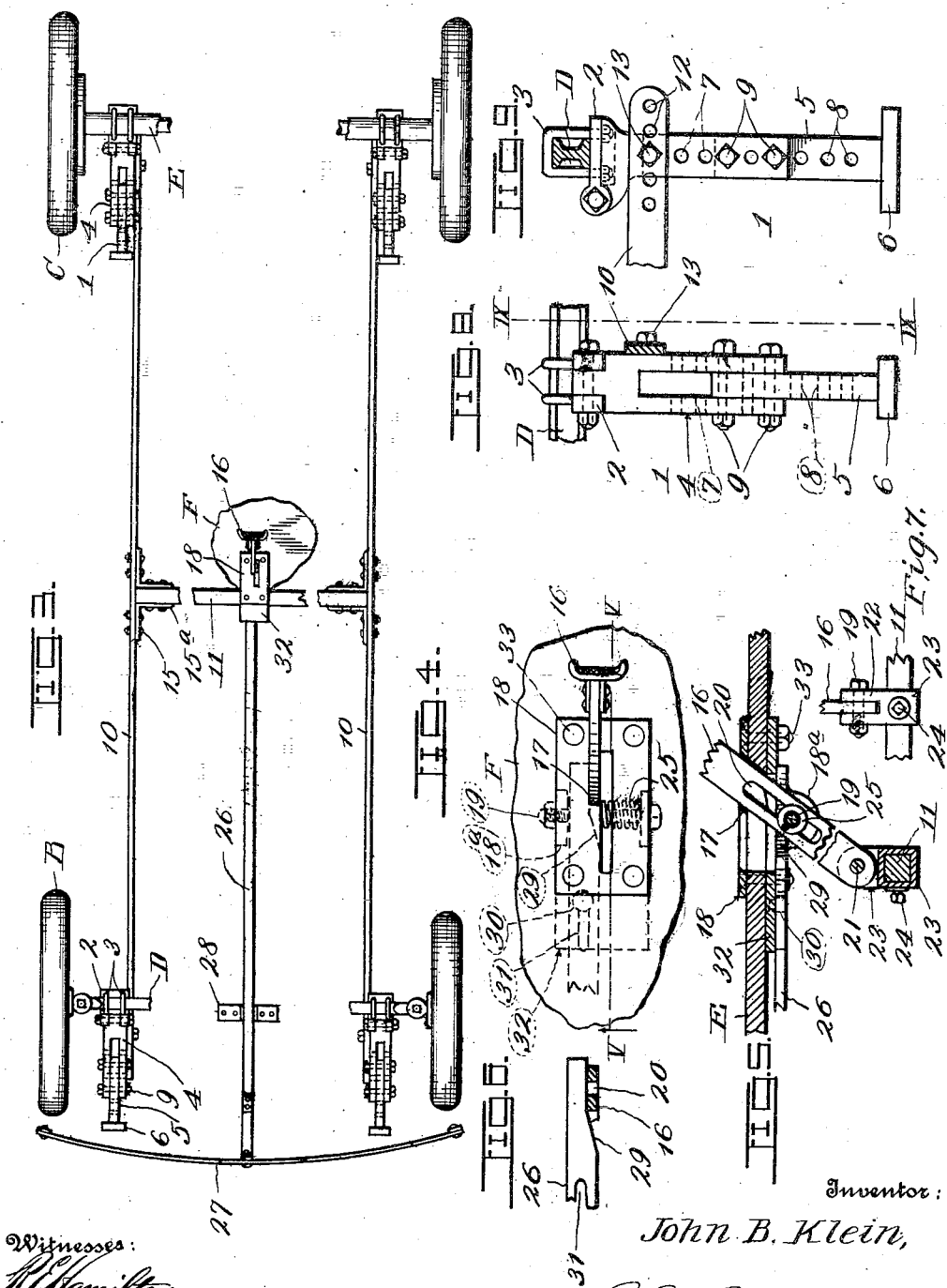

JOHN B. KLEIN, OF KANSAS CITY, KANSAS.

AUTOMATIC AUTOMOBILE-JACK.

1,177,340.  Specification of Letters Patent.  Patented Mar. 28, 1916.

Application filed August 16, 1915. Serial No. 45,670.

*To all whom it may concern:*

Be it known that I, JOHN B. KLEIN, a citizen of the United States, residing at Kansas City, in the county of Wyandotte and State of Kansas, have invented certain new and useful Improvements in Automatic Automobile-Jacks, of which the following is a specification.

My invention relates to automatic automobile jacks, and it embodies a bumper, which, on collision with an object offering sufficient resistance, automatically lowers legs of the jack, that lift the automobile bodily from the surface of a road and effectually check its progress until it is manually lowered by pushing it backward off of said legs.

The invention also embodies manually controlled means for lowering the legs, so that the automobile can be jacked up to relieve the tires of its weight while standing in a garage, or so that any of the tires needing repairs can be removed from the wheel rims.

In order that said invention may be fully understood, reference will now be made to the accompanying drawings, in which:

Figure 1 is a longitudinal sectional view of the jack applied to an automobile, which is shown in raised position. Fig. 2 is a longitudinal sectional view of the jack applied to the automobile, which is in lowered position. Fig. 3 is a plan view of the parts disclosed by Fig. 2, with the body of the automobile removed. Fig. 4 is a broken detail plan view of a foot lever and adjacent parts. Fig. 5 is a broken section on line V—V of Fig. 4. Fig. 6 is a broken plan view of a push-bar and a lever constituting parts of the invention. Fig. 7 is a broken front elevation of the foot lever and adjacent parts. Fig. 8 is a broken front elevation of the front axle of the automobile with one of the legs of the jack connected thereto.
Fig. 9 is a vertical section on line IX—IX of Fig. 8.

Referring now in detail to the several parts, A designates an automobile provided with the customary body, A', and front and rear wheels B and C, mounted upon the front and rear axles D and E, respectively.

1 designates the legs of the jack, one pair of which is mounted beneath the front axle and another pair beneath the rear axle adjacent the wheels B and C. Each leg is hinged at its upper end to a plate 2, which in turn is secured to the underside of an axle by U-bolts 3.

The legs 1 are extensible, so that they can be adjusted to different automobiles having wheels of different diameters, and to this end I provide each leg with an upper member 4 and a lower member 5, which latter is provided at its lower end with a foot 6. The members 4 and 5 have transverse holes 7 and 8, respectively, spaced equal distances apart and adapted to receive bolts 9, whereby said members 4 and 5 are rigidly connected after they have been adjusted to the proper length.

In order that the legs may operate in unison, each front leg is connected to a rear leg by a connecting bar 10, and the connecting bars 10 are united by a transverse bar 11. The connecting bars 10 have a series of perforations 12 at each end to accommodate automobiles having wheel bases of different lengths. Bolts 13 adapted to pass through any of said perforations 12 are provided for pivotally securing the connecting bars 10 to the legs 1. Each connecting bar 10 is also provided with a series of perforations 14 intermediate its ends, so that the transverse bar 11 which is secured to the connecting bars 10 by bolts 15 and corner irons 15ª, can be adjusted backward or forward to properly position a foot lever 16, which extends upward through a slot in the floor F of the automobile body and is in normal engagement with a shoulder 17, of a slotted plate 18, secured to the upper surface of the floor and provided with depending ears 18ª, having a transverse bolt 19, which extends through a longitudinal slot 20 in the foot lever 16, so that the latter may move up and down on said bolt when the legs 1 swing up and down on their hinges.

The lower end of the lever 16 is pivotally connected by a bolt 21 to a pair of ears 22, secured to a sleeve 23 adjustably mounted upon the transverse bar 11 to permit lateral adjustment of the lever 16, so that it may be located out of the way of the customary control levers of the automobile. After the sleeve 23, has been adjusted to the desired point upon the transverse bar 11, it is secured from accidental movement by a set-screw 24 extending therethrough.

The lever 16 is yieldingly held in engagement with the shoulder 17 of the slotted plate 18, by a coiled spring 25 embracing the bolt 19 and interposed between said lever 16 and one of the ears 22. The lever 16 may be either manually operated to lower the legs 1 by throwing it forward with the foot to the position disclosed by Fig. 1, or it may be automatically actuated through the intermediacy of a push-bar 26 and a bumper 27, which latter is secured to the front end of the former and arranged in advance of the front wheels B of the automobile.

The push-bar 26 extends rearwardly through a guide 28 and has a beveled rear end 29 supported by a bolt 30, extending through a slot 31 in said rear end and secured at its upper end to a slotted plate 32, secured to the underside of the floor by bolts 33, which pass upward through the floor F and secure the slotted plate 18 thereon. The ends of the slot 31 and the bolt 30 limit the movement of the push-bar 26, which is normally held in forward position by a coiled spring 34, secured at one end to said push-bar and at its opposite end to the guide 28.

The operation is as follows: Should the bumper 27 strike another automobile or an obstacle on the road, said bumper is forced backward by the impact and forces the push-bar 26 back therewith, causing the beveled edge 29 to act on one side of the foot lever 16 and push the same laterally out of engagement with the shoulder 17, whereupon the legs 1 swing downward into contact with the surface of the road and the automobile through the force of momentum, is carried forward and upward until the legs 1 assume a perpendicular position, when further travel of the automobile is effectually checked. The automobile remains in raised position until pushed backward off the legs 1, which may then be raised to the position disclosed by Fig. 2, and locked in such raised position by the foot lever 16 and the shoulder 17.

The jack may also be actuated to lift the automobile in a garage by providing a post or other suitable obstacle for the bumper 23 to contact while the automobile is in motion, or the legs 1 may be dropped through manual operation of the foot lever 16, so that the momentum of the car will carry it forward and upward as previously described.

While I have shown and described the preferred form of my invention, I reserve the right to make such changes in the construction, proportion, and arrangement of parts as properly fall within the spirit and scope of the claims.

Having thus described my invention, what I claim and desire to secure by Letters Patent, is:

1. In combination with an automobile, a jack consisting of legs connected to the automobile axles, a connecting bar between the legs, a manually controlled lever pivoted at its lower end to said bar, said lever being longitudinally slotted, a plate secured to the automobile body and having a slot through which said lever projects and a lateral shoulder normally engaged by the lever, a bolt connected to the plate and passing through the lever slot, a spring encircling the bolt and abutting the lever to normally hold the lever in engagement with the shoulder, and a bumper carried by the automobile and having a beveled end which latter upon inward movement of the bumper engages the lever and moves the latter laterally and out of engagement with the shoulder.

2. In combination with an automobile, a jack consisting of legs connected to the automobile axles, a connecting bar between the legs, a manually controlled lever pivoted at its lower end to said bar, said lever being longitudinally slotted, a plate secured to the automobile body and having a slot through which said lever projects and a lateral shoulder normally engaged by the lever, a bolt connected to the plate and passing through the lever slot, means to resiliently and normally hold the lever in engagement with the shoulder, and a bumper carried by the automobile and formed to engage the lever and move same laterally and thereby out of engagement with the shoulder upon inward movement of the bumper.

3. In combination with an automobile, a jack thereon movable into and out of engagement with the ground, a manually controlled spring pressed and laterally movable lever in connection with the jack, an abutment on the automobile normally engaged by the lever, and a bumper having means thereon which upon inward movement of the bumper moves the lever laterally out of engagement with the abutment.

In testimony whereof I affix my signature in the presence of two witnesses.

JOHN B. KLEIN.

Witnesses:
F. G. FISCHER,
L. J. FISCHER.